A. RAVELLI.
APPARATUS FOR UTILIZING THE MOVEMENT OF THE SEA WAVES.
APPLICATION FILED AUG. 21, 1907.
947,846.
Patented Feb. 1, 1910.
4 SHEETS—SHEET 1.
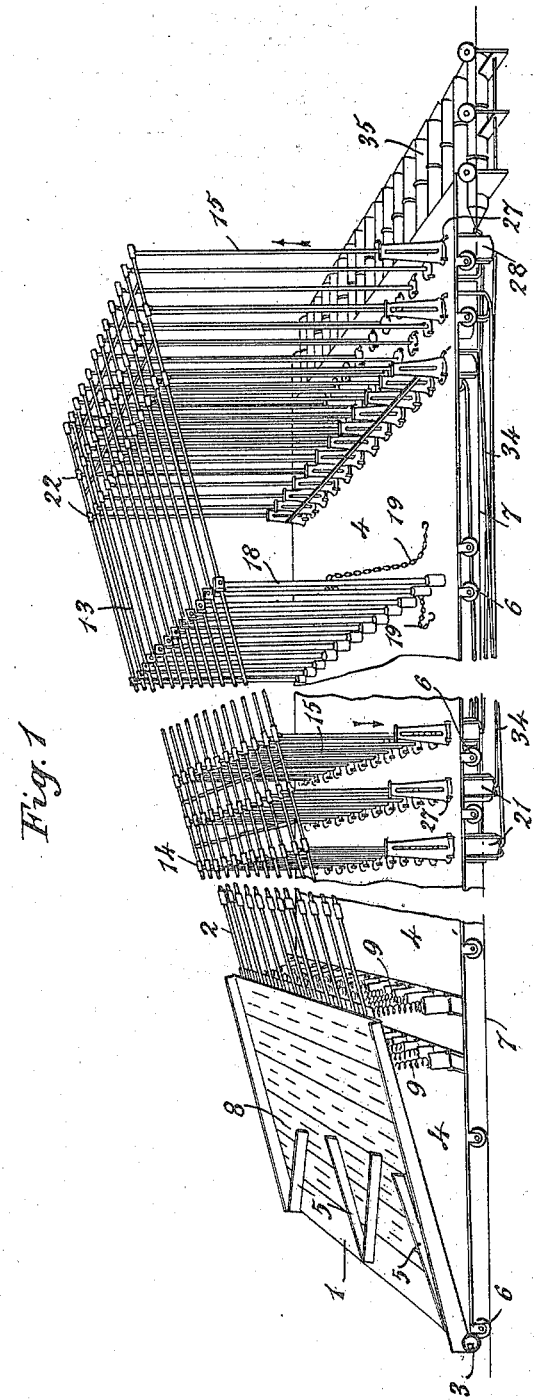

A. RAVELLI.
APPARATUS FOR UTILIZING THE MOVEMENT OF THE SEA WAVES.
APPLICATION FILED AUG. 21, 1907.
947,846.
Patented Feb. 1, 1910.
4 SHEETS—SHEET 2.
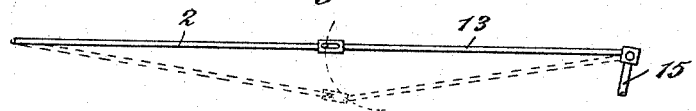
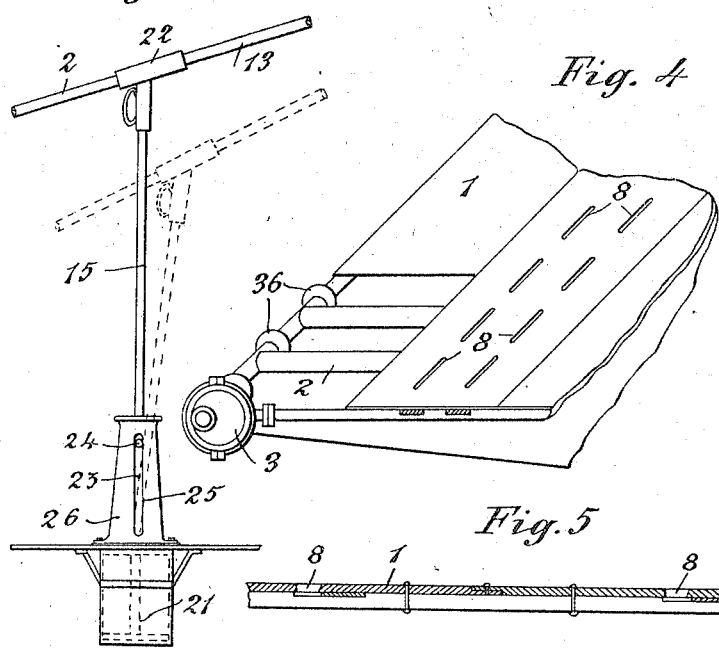
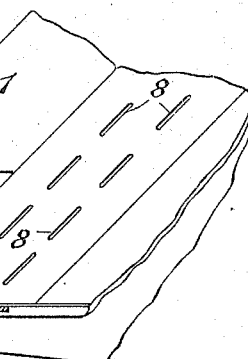
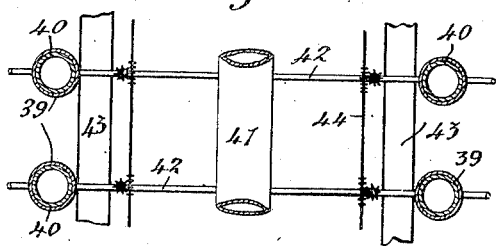
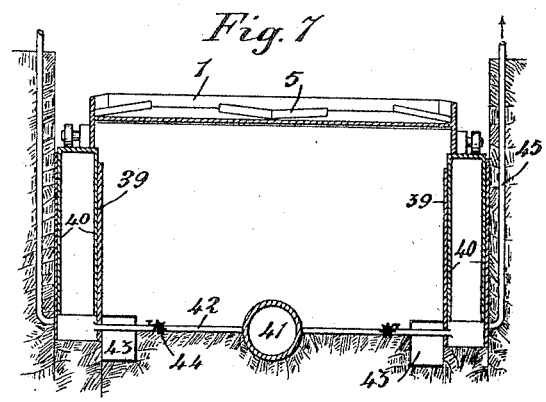

A. RAVELLI.
APPARATUS FOR UTILIZING THE MOVEMENT OF THE SEA WAVES.
APPLICATION FILED AUG. 21, 1907.
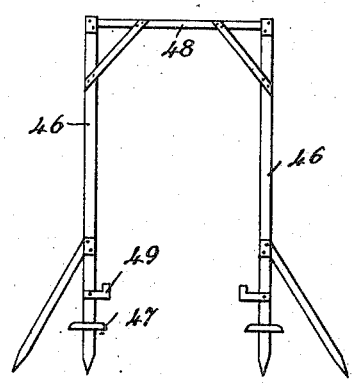
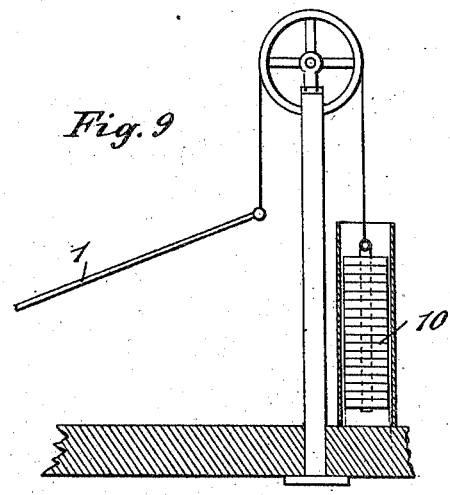
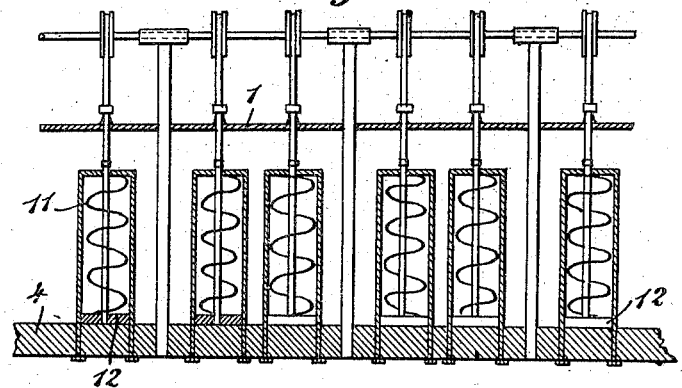
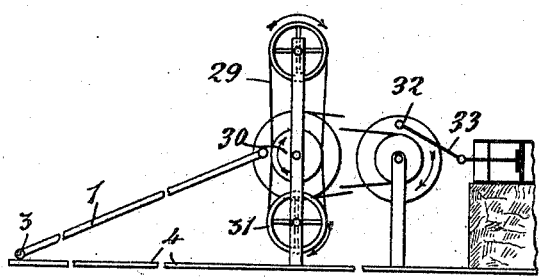
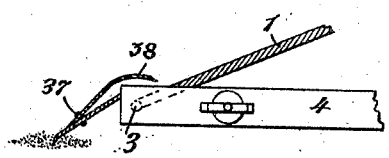

A. RAVELLI.
APPARATUS FOR UTILIZING THE MOVEMENT OF THE SEA WAVES.
APPLICATION FILED AUG. 21, 1907.
947,846.
Patented Feb. 1, 1910.
4 SHEETS—SHEET 4.
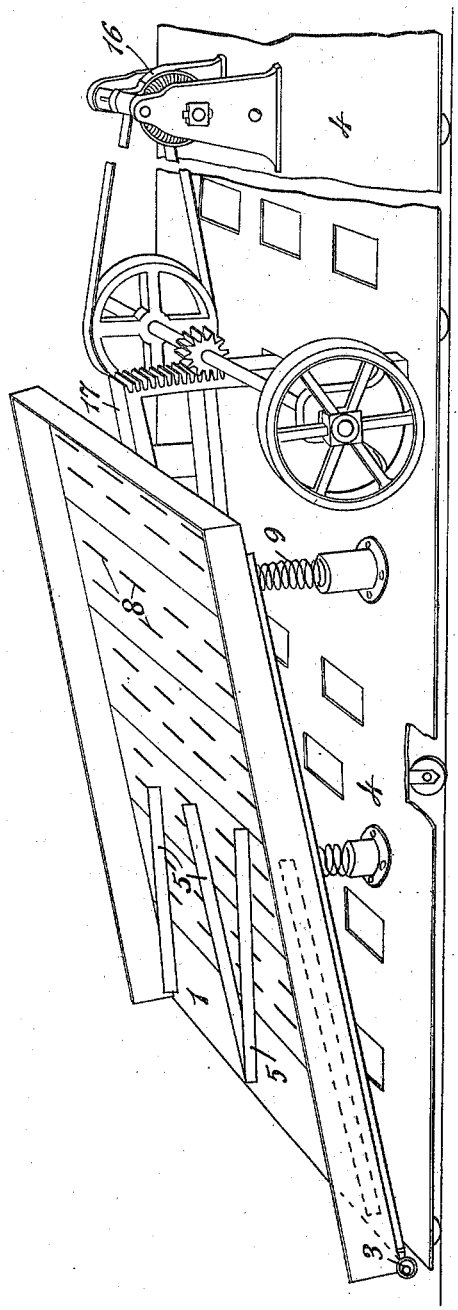

UNITED STATES PATENT OFFICE.

AGOSTINO RAVELLI, OF CAPRIATA D'ORBA, NEAR ALESSANDRIA, ITALY.

APPARATUS FOR UTILIZING THE MOVEMENT OF THE SEA-WAVES.

947,846.

Specification of Letters Patent.

Patented Feb. 1, 1910.

Application filed August 21, 1907. Serial No. 389,470.

*To all whom it may concern:*

Be it known that I, AGOSTINO RAVELLI, subject of the King of Italy, residing at Capriata d'Orba, near Alessandria, Italy, have invented certain new and useful Improved Apparatus for Utilizing the Movement of the Sea-Waves, of which the following is a specification.

My present invention relates to improvements in apparatus for utilizing the movement of the sea-waves for the purpose of generating motive power.

Prior patents of applicant's cover an apparatus of this kind comprising an inclined platform on which the waves of the sea roll up under the impulse of their natural living force and thus depress the platform by their weight and impact and cause the same to operate air compressors, dynamo electric machines, pumps etc. through intermediate devices such as levers, connecting rods, gearings etc.

The object of my present invention is to provide an improved apparatus of this kind, comprising substantially a horizontal platform in combination with a movable inclined platform operating piston rods for air compressors, or toothed sectors, pulleys etc. for the transformation of vertical movement into intermittent rotary movement, the said platforms being held in position of rest, for instance, by coiled springs.

My said improved apparatus is shown in the annexed drawings.

Figure 1 is a perspective view of my improved apparatus, parts being broken away. Fig. 2 a detail view showing the rods for supporting the inclined platform. Fig. 3 a detail view showing the connection of the piston of an air compressor with one of the supporting rods. Fig. 4 shows a portion of the forward end of the inclined platform. Fig. 5 is a section through a portion of the platform. Fig. 6 is a plan and Fig. 7 a vertical cross-sectional view of an adjustable support for the carriage carrying the inclined platform. Fig. 8 is a simplified construction of such a support. Fig. 9 shows a counter-weight for returning the inclined platform after each depression to its original position. Fig. 10 is a modified construction, partly in section, for the same purpose. Fig. 11 shows the front and rear portion of the inclined platform and of the carriage, and means for transmitting the up and down movement of the former to a dynamo. Fig. 12 is a diagrammatic view showing the rear end of the inclined platform connected with cables running over pulleys. Fig. 13 shows in section the extreme front end of the inclined platform and means for guiding the waves onto the same.

The apparatus comprises the following parts: 1—members adapted to collect the energy of the sea-waves, working surface or the like; 2—members adapted to actuate compressors and to collect and distribute the compressed air; 3—members adapted to transform the vertical movement into alterrate rotary movement; 4—members adapted to return the working surface to its position of rest; 5—members for rendering the working surface elastic; 6—supporting members for allowing the apparatus to be displaced in a longitudinal as well as in a vertical direction, so as to favor the flow and the rising of the waves upon the working surface.

The apparatus illustrated in Fig. 1 comprises; a movable and inclined platform or working surface, 1, constituted by a strong metallic plate resting upon a scaffold formed of strong steel bars, 2. This surface is capable of pivoting around a fulcrum 3 carried by a supporting plate or carriage 4 and receives the energy of the waves which traverse it when rising by the *vis-viva* imparted to them by the wind, and impart to it, owing to their weight, a downward movement.

In order to better utilize the power of small waves, when the working surface is operated during a quiet sea, it has been found advantageous to fix upon said surface vertical guide walls, 5, forming two small channels, about three meters long which are contracted toward their upper end as illustrated in Figs. 1 and 11; in this way the water will rise higher up the working surface than would a similar quantity of water if there were no such guides; this is owing to the great speed imparted to the water by the contraction of said channels.

The degree of slope of the working surface is regulated according to the height of the waves, in order to better utilize their *vis-viva*. Its width may vary from a minimum of a few meters to a maximum of several meters, while its length varies in proportion with the power of the wave, this variation being obtained by removing or inserting complete sections of the apparatus of predetermined length, which sections are always ready for use.

As the working surface 1 has to be adapted to the variable conditions of the sea, the same is supported by a carriage or supporting plate, 4 provided with lateral rollers 6 upon rails 7 indicated by a line in Fig. 1, and permitting a forward or backward movement of the apparatus so that the whole wave may act upon the table or working surface in the most useful manner. Outside this carriage 4, which is larger than the working surface in order that the point of origin of the latter can freely oscillate around a spindle supported in bearings arranged as near as possible to the surface of the shore, special supports are provided (Fig. 13) for the purpose of collecting the whole wave which otherwise would partly pass beneath the carriage. This carriage (which has a base of about 7 meters long and serves to utilize the small sea waves) may be extended by means of sections so as to obtain the necessary length for absorbing the whole *vis-viva* of the sea-waves, even the highest.

In order to discharge the water from the working surface after the energy of the wave has been spent, the working surface is provided with a plurality of small discharging openings, 8, arranged in series transversely of the said surface and parallel to the fulcrum shaft, 3, which openings are opened or closed by means of sluices automatically controlled by well known devices. By such an arrangement the working surface is very quickly cleared of water and ready to receive the next wave. Figs. 4 and 5 illustrate this special arrangement.

The weight of the wave produces the downward movement; the inverse namely the upward movement is produced by means of a system of strong springs, 9, preferably of the helical type, (Figs. 1 and 11) or by means of other devices, arranged at the rear end of the apparatus, such as counterweights 10, as shown in Fig. 9, or springs, 11, combined with pistons 12, as shown in Fig. 10 which balance the weight of the working surface, 1.

The device illustrated in Fig. 10 is analogous to that shown in Fig. 9, it differs however therefrom in this that when the working surface (1) moves downward, instead of raising the weights which effect its upward movement, after the water has been discharged, it compresses springs arranged around piston rods, the pistons being placed in suitable cylinders for the purpose of protecting them against sea corrosions and the rods in consequence of the spring reaction forcing the pistons to return to their position of rest and simultaneously raise the working surface. The number of acting springs and the number of counter-weights depend upon the length of the working surface and the system has been so adapted that springs and counterweights may easily be put out of action and sections of the apparatus may if necessary be disconnected and removed. At the end of the downward movement, the working surface stops with an inclination of 5% in order to facilitate the return of the sea water which can not be discharged through the openings.

The steel bars, 2, upon which the working surface, 1, rests, form firstly a working system which has an axis 3 of rotation the same as that of the working surface, and secondly, where the apparatus is arranged in the manner illustrated in Fig. 1, the bars 2 can be extended beyond the length of the proper working surface. The rear ends of the bars 2 can be connected to beams 13 which control compressors by means of special joints, 14, permitting the beams 2 and 13 to freely effect their oscillating movement (Fig. 2) (see dotted lines).

The air compressing device may be disposed according to Fig. 1 wherein the compressors, shown by way of example, are directly operated by the working surface during its oscillating movement, by means of connecting rods, 15, or, when the compressors are arranged on the shore, they are actuated by electrical or mechanical power developed by the working surface (Figs. 11 and 12). The latter operates in the manner illustrated in Fig. 11, by actuating a dynamo 16 or any other device capable of producing power, for instance by means of a toothed sector 17, or analogous devices, which transform the vertical movement into rotary or alternating rotary movement.

In a case wherein the air is directly compressed, the compressing device comprises three main parts, viz., supporting levers 18, controlling levers 13 and compressing cylinders (Fig. 1). The lever supports, 18, are formed by strong cast iron columns fixed upon the carrying plate, 4. The controlling levers, 13 of the compressors are pivotally secured to the upper ends of the columns 18. Arresting chains 19, are connected to these supports and they can be hooked into the levers 13, serving to fix the working surface in a high or low position, according to the necessity.

At the junction points of the levers 13 with the connecting rods 15, sleeves 22 are fixed onto the connecting rods and are capable of being displaced along the levers, for permitting the oscillation of the working surface (Fig. 1). The connecting rods 15, are connected to the rods 23 of the compressor pistons in the usual manner; it is however necessary to insure a vertical movement of the pistons, in spite of the oblique position the connecting rods are assuming during their oscillating movement. Pins, 24, are provided at the junction point of the connecting rods and the heads of the piston rods, which pins slide in slots 25 formed in the guiding supports, 26, resting upon the upper part of the compressor cylinder (Fig. 3). As in the case illustrated in Fig. 1, the pistons of all the compressors have to perform simultaneously the compression stroke, they are constructed in such a manner that in the series arranged in front of the supports, 18, the compression is effected with the downward movement of the pistons, while in the series arranged behind said supports, the compression is effected during the upward movement of the pistons.

The compressor cylinders, 21, are of the Greig type and they work under sea water. They are provided with suitable suction valves capable of communicating with the air outside by means of pipes 27 extending along the cylinder walls. At the point where these pipes join each other at the end of the cylinder, they present a small enlargement or air chamber (not shown in the drawings) for facilitating the operation of the suction valves. The front cylinders are provided at their upper ends with valves (not shown in the drawings) which are opened upwardly and which can remain open according to necessity. According to the particular case, these valves permit atmospheric pressure to act freely upon the upper end of the piston or an air layer to form between the piston end and the cylinder, which layer by regulating the resistance of the upward movement of the piston cushions the shocks when the sea is heavy. The compressors of the rear series, 28, are arranged in opposite sense to those of the front series, the compression being effected by the rising of the working surface. In the case of the modification shown in Fig. 12, the compressors may be arranged horizontally on the rear portion of the supporting carriage 4. The working surface 1, in its oscillating movement produces by means of the transmitting pulleys 29, 30 and 31 a rotary movement of the pulley, 32, which is transformed into a reciprocating movement by means of the connecting rod, 33.

The accumulators, 35, as well as the pipes 34 which lead the air thereto, are supported by means of stirrups connected to the carriage, 4. As the power obtained from the sea-waves varies considerably, the compressing devices have been constructed in such a manner as to develop in each case, except of course when the sea is quiet, a power proportional to the energy supplied by the sea. This fact explains why such a great number of compressors are used, which must all be inter-connected in such a manner that only the number of compressors proportional to the wave power are brought into action by simple lever control. The apparatus must always be in perfect balance, this being obtained by adding or taking off predetermined weights corresponding to the beams, 13, or springs corresponding to the working surface.

In order that the apparatus shall work in a regular manner, its carrying plate, 4, must always be at the sea-level. Supports 36 for the axis around which the working surface rotates (Fig. 4) are fixed at the front end of the said plate 4. This device is protected against the direct shocks of the waves by a special appendage (Fig. 13) consisting of a strong metal plate 37, fixed at the front end of the carrying plate 4 and carrying on its upper surface a second metallic plate, 38, secured to it by means of bolts and slightly bent in order to better protect the rotating device of the working surface against the waves and the sand and to facilitate the rising of the wave-water. Different methods may be used for the installation and operation of the apparatus, the most practical consisting in the construction on the sea-shore of a channel which is a little wider than the apparatus, of such a depth that the compressed air pipes, which are adapted to permit the apparatus to rise and fall during the tides, may be easily installed, and about twice as long as the apparatus itself. The sides and bottom of the channel are preferably of concrete.

One of the features of the invention is that the apparatus can, by the provision of any suitable means, rise and fall so that it shall always be at the level of the water in spite of the movement of the tides. With this object in view, use is made of the device illustrated by way of example in Figs. 6, and 7. On the banks of the channel and at intervals of about one meter, metallic pipes 39 of predetermined height are forced into the ground and pipes 40, closed at their upper ends fitted therein; the pipes 39 acting as cylinders and the pipes 40 as pistons. On the upper end of the inner pipes or pipe pistons, 40, there may be fixed on each side, rails upon which the rollers 6, supporting the carrying plate 4 are adapted to roll. In order to effect the rising or falling of the apparatus (Figs. 6 and 7) for the purpose of economy, a part of the compressed air produced by the apparatus itself is employed. The air is firstly led into a main central pipe 41, and from thence it is conducted by means of secondary pipes 42, into the longitudinal chambers 43, then into the hollow pistons 40 which are thus raised to the desired point, owing to the expansion of the air. By decreasing the pressure, these cylinder pistons descend under the weight of the apparatus down to the desired point, corresponding to the sinking of the tide. It is to be understood that the valves 44, which control the introduction of the air into the vertical cylinders 40 can be controlled directly or indirectly from the shore in such a manner that the rising and falling of the cylinders, by means of special devices, shall be effected simultaneously. At the lower ends of the pipes 39, and always communicating with the chambers 43, are arranged the discharge pipes 45, which pass through the banks of the channel and are controlled from the shore by means of suitable devices, such as rods, electric transmission devices, valves and the like.

The channel mentioned above may be replaced by the device illustrated in Fig. 8, which device is economical and very advantageous where the variations in the level of the tides are very small. This device consists of a series of iron posts or beams, 46, firmly fastened into the sea shore at distances corresponding to the width of the apparatus used, and in order that they shall not yield to the weight of the apparatus, they may be provided at the ground level with stopping flanges, 47 and be rigidly secured at their upper ends by cross-bars, 48. At the lower ends the posts 46, may be reinforced by braces. Guiding supports 49, are secured on the vertical posts, inside this scaffold or frame, said supports carrying the apparatus which can be displaced longitudinally. An inclination nearly corresponding to the slope of the shore can be imparted to the guiding supports when the sea is agitated. Owing to this arrangement of the guiding supports, by displacing the apparatus along the supports, the same can be maintained at the level of the water surface, in spite of the movement of the tide. The inclination which the apparatus can assume in this manner can, if necessary, be corrected by substituting differential wheels for the rollers, 6. The differential wheels are always necessary when the working surface is employed to directly operate pumps for raising water.

What I claim is—

1. Apparatus for utilizing the power of the sea-waves, comprising a platform of variable dimensions and inclination, adapted to move up and down about an axis, springs supporting said platform in its normal position, a set of bars secured to the platform and supporting the same, a second set of bars connected with the said first set of bars and pivoted to upright supports, a plurality of air compressors on opposite sides of said supports, and connecting rods between the said two sets of bars and the pistons of the said air compressors all for the purpose as described and specified.

2. Apparatus for utilizing the power of the sea-waves, comprising a movable carriage, an axis supported at the front end thereof, a platform of variable dimensions and inclination, adapted to move up and down about said axis, springs supporting said platform in its raised position, a set of bars secured to the platform, a second set of bars connected with the said first set of bars and pivoted to upright supports, a plurality of air compressors arranged at opposite sides of said supports, and connecting rods between the said two sets of bars and the pistons of the said air compressors.

3. Apparatus for utilizing the power of the sea-waves, comprising a traveling carriage, an axis supported at the front end thereof, a platform of variable dimensions and inclinations adapted to move up and down about said axis, springs supporting said platform in its raised position and means connected with said platform for transmitting its up and down movements.

4. Apparatus for utilizing the power of the sea-waves, comprising a carriage, an axis supported at the forward end thereof, a platform of variable dimensions and inclination adapted to move up and down about said axis, springs supporting said platform in its raised position, means connected with said platform for transmitting its up and down movements, a metal plate secured to the front of the said carriage in an inclined position, a second metal plate secured to the said first metal plate, said metal plates serving as a pass for the waves rolling onto the said platform.

5. Apparatus for utilizing the power of the sea-waves, comprising a carriage, an axis supported at its front, a platform of variable dimensions and inclinations adapted to move about said axis, springs supporting said platform in its raised position, means connected with said platform for transmitting its movements, and guide-walls provided on the platform converging toward their upper ends.

6. Apparatus for utilizing the power of the sea-waves, comprising a carriage, an axis supported at its forward end, a platform of variable dimensions and inclinations adapted to move about said axis, means for supporting said platform in its raised position, means connected with said platform for transmitting its up and down movements, discharge openings in said platform and slides adapted to open and close said openings.

7. Apparatus for utilizing the power of the sea-waves, comprising a platform of variable dimensions and inclinations adapted to move up and down about an axis, a carriage supporting said axis, means supporting said platform in its raised position, a set of bars secured to the platform, a second set of bars connected with the said first set of bars and pivoted to upright supports, a plurality of air compressors located at both sides of said supports, connecting rods between the said two sets of bars and the pistons of the said air compressors, accumulators for the compressed air, and pipes connecting the said accumulators with the cylinders of the said air compressors.

8. Apparatus for utilizing the power of the sea-waves, comprising a carriage, an axis supported at its forward end, a platform of variable dimensions and inclination adapted to move in the path of an arc about said axis, means for supporting the said platform in its raised position, means connected with the said platform for transmitting its movement, two rows of vertical cylinders, hollow pistons movable therein, rails fixed to the upper ends of the said pistons adapted to support the said carriage, conduits connected with the said cylinders to supply air under pressure thereto, and means for controlling the said supply of air under pressure.

In testimony whereof I have affixed my signature in presence of two witnesses.

AGOSTINO RAVELLI.

Witnesses:
 CERENZIO SEEPI,
 GEORGIO JACOPETTI.